2,793,650

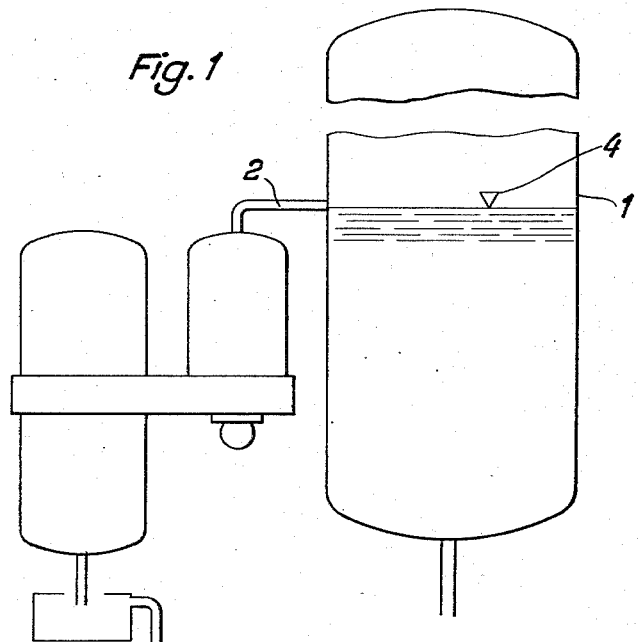
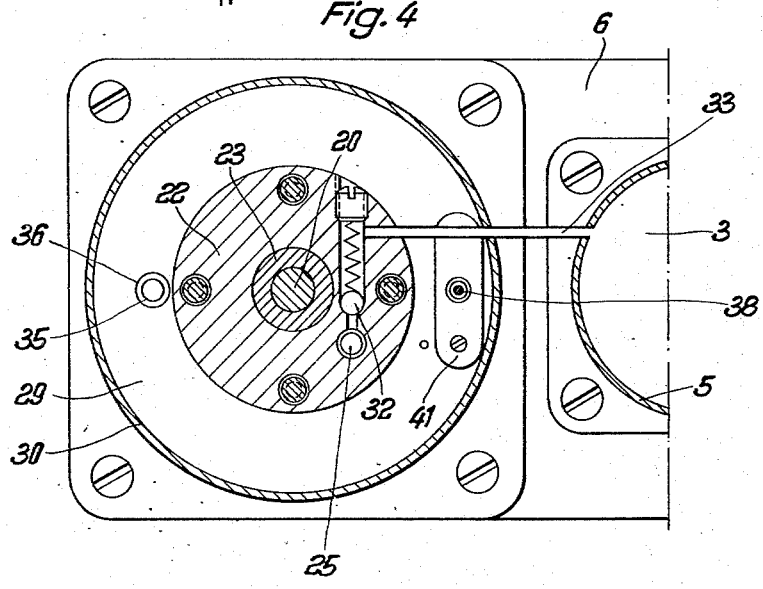

AUTOMATIC AIR VOLUME CONTROL IN PRESSURE TANKS, PARTICULARLY IN HIGH PRESSURE OIL TANKS

Otto Kracht and Hans Schumacher, Werdohl, Germany, assignors to Kracht Pumpen- und Motorenfabrik G. m. b. H., Werdohl, Germany Application April 21, 1954, Serial No. 424,666

13 Claims. (Cl. 137—269)

The invention relates to a device for automatically controlling the air cushion in pressure tanks of water or oil supply systems, and more particularly to means automatically controlling the air cushion in oil tanks being under a high operating pressure.

In plants automatically supplying water at high or low pressure and even more in plants for supplying pressure oil, experience has shown that troubles are caused by the gradual shrinking of the air cushion maintained above the liquid level in the storage tank. In order to achieve an economical operation of such a plant, a replenishing of the air cushion is required, which should be as simple as possible, and automatic. In our application, Ser. No. 398,376, filed December 15, 1953, for Automatic Air Volume Control for Liquid Supply Systems, we have disclosed various devices for automatically controlling the air cushion in the pressure tanks of such plants which counteract effectively the reduction of the air cushion occurring during the operation, and fill up automatically the air cushion in the pressure tank of the plant after it has become too small for the desired normal value. These devices are satisfactory for the conditions prevailing in water feeding plants and also in pressure oil plants operating at low or medium pressures. However, these devices do not fulfill their task to full satisfaction in plants operating at a higher pressure.

In the device disclosed in said application, Ser. No. 398,376, the reversal from "filling" the housing of the regulator to "emptying" is effected by float-controlled valves. Hereby, it cannot be avoided that at the moment when the float starts lifting and opening the emptying valve, a certain residual air space (dead space) is present in the housing of the regulator which is approximately under the pressure obtaining at the time within the pressure tank. On the other hand, for the compression of the air sucked into the housing of the regulator at the emptying thereof, Boyle's law is controlling: thus in plants operating at higher pressures an appreciable part of the volume of the regulator is first used for compressing the inhaled air to the obtaining operating pressure before any air can flow from the regulator into the air cushion of the pressure tank. But if a compression of the inhaled air to the operating pressure requires such a considerable volume reduction that only the volume of said residual air space remains available, air can no longer be transferred from the regulator to the pressure tank. The regulator is therefore unable to fulfill its purpose.

It is an object of the invention to provide a plant being a further development of the inventive idea of the application, Serial No. 398,376, mentioned hereinabove.

It is another object of the invention to provide at higher operating pressures a satisfactory automatic control of the air cushion present in the pressure tank.

According to the invention, a controlling device having the form of a differential pressure compressor is connected to the pressure tank at the desired maximum height of the liquid level, which controlling device is operated by means of the pressure liquid in the tank.

The volume of the desired air cushion can be predetermined by the height of the mouth of the connecting pipe between the controlling device and the pressure tank.

A further characteristic feature of the invention is a float valve in which, instead of a hollow float, a displacement body is used having a higher specific gravity than that of the liquid displaced thereby. Preferably, part of the weight of the displacement body is taken up by a spring, so that said body is raised by the uplift at a predetermined degree of immersion though its weight actually exceeds the uplift at full submersion.

In a further embodiment of the invention, the air may be completely displaced from the compression chamber or space of the control device by means of a liquid volume automatically maintained on the piston head.

Specific means are provided to prevent water, which may be precipitated on compression of the air, from entering the oil space of the pressure tank.

A further characteristic feature of the invention is the reversal of the piston movement from one direction into the opposite direction by means of a single controlling piston in connection with magnetic gripping rods.

The invention will now be described more in detail as to its construction and operation, reference being made to the accompanying drawings showing, by way of example an embodiment thereof.

In the drawings:

Fig. 1 is a schematic side elevation of an embodiment of the invention comprising a pressure tank with a controlling device and an antechamber to the controlling device;

Fig. 4 is a horizontal cross section of the controlling device and part of the antechamber taken along the line II—II of Fig. 2.

Figure 2:
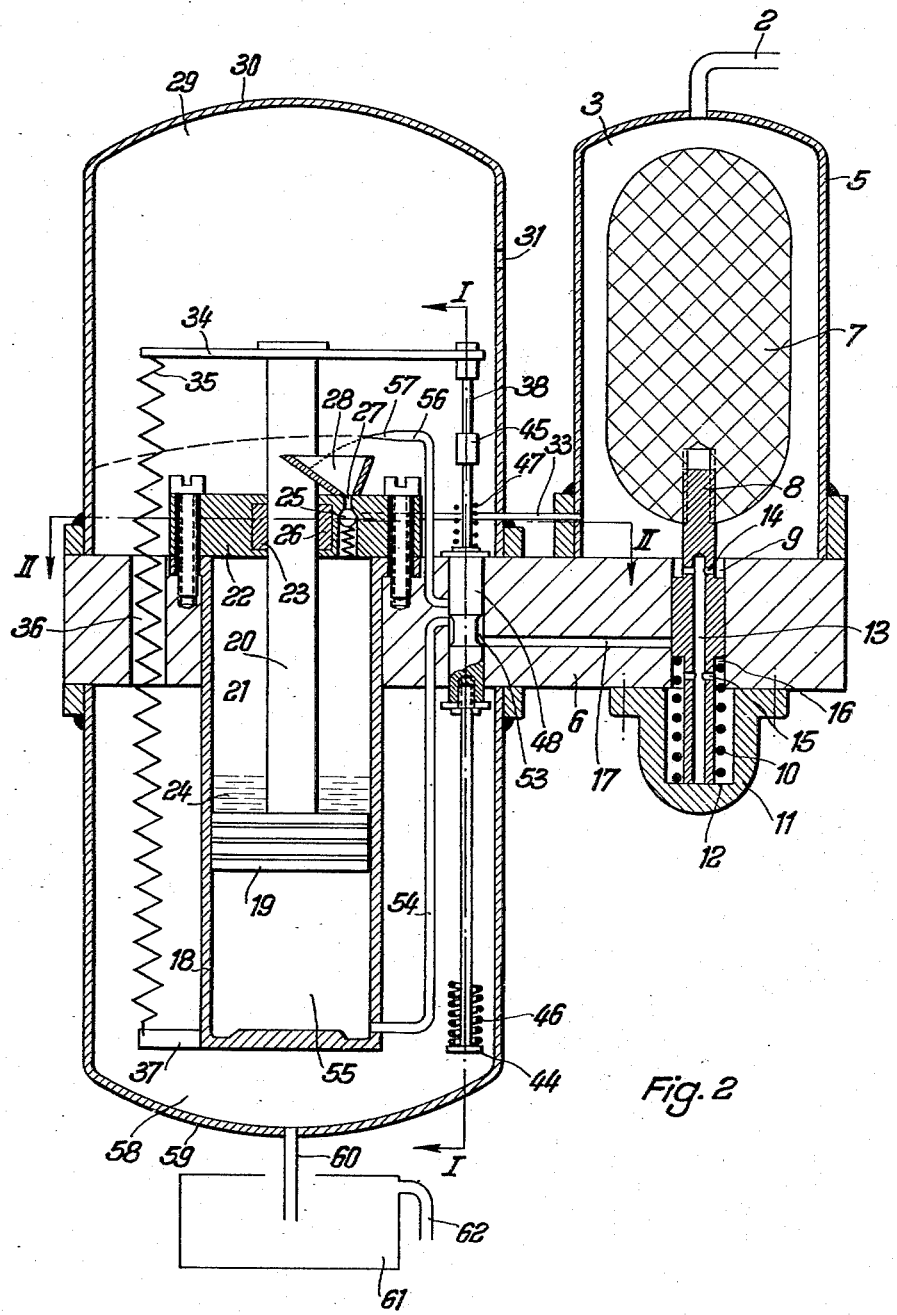
Fig. 2 is a vertical axial section at an enlarged scale through the controlling device and the antechamber shown in Fig. 1.

Referring now to the drawings: 1 is a pressure tank of the pressure oil supply plant intended for high operating pressures. A connecting pipe 2 leads from the highest point of an antechamber 3 to the pressure tank 1, the height being so chosen as to correspond to the oil level 4 at the pressure at which the pump is switched off (maximum pressure). In this way, the volume of the normally desired air cushion above the oil level is determined: if pressure oil is withdrawn from the tank 1, the oil level drops and the air cushion expands under reduction of pressure until the pump starting pressure is reached and the pump starts again to operate and replenishes the oil supply in the tank 1 to the desired height 4 of the oil level. The task of the controlling device and the antechamber thereof is the automatic establishment or re-establishment of the normal operating condition, if, respectively, the plant has to be taken into operation for the first time or the air cushion has too far diminished during operation.

The pipe 2 may either be horizontal or slightly inclined from the pressure tank downwardly to the antechamber 3; under no circumstances must the pipe 2 be inclined upwardly from the pressure tank 1 to the antechamber 3.

The antechamber 3, which is under the operating pressure of the pressure tank 1, consists of a pressure hood 5 which is sealed to the valve body 6. A displacement body 7 enclosed in the antechamber 3 is provided at its lower end with a control piston 8, which with oil tight fit is axially displaceable in a vertical bore 9 of the valve body 6. As the displacement body 7 is exposed to the full operating pressure, it is not made as a hollow float but preferably as a massive or solid body of suitable material. The weight of such a displacement body exceeds the uplift to which it is subjected when completely submerged in the pressure liquid. In order to cause the displacement body 7 to float up at a predetermined degree of immersion, notwithstanding its large weight, so as to allow the control piston 8 to carry out its desired movement, a compression spring 10 is arranged underneath said control piston 8 which takes up partially the own weight of the displacement body 7 and of the control piston 8. Thus it is accomplished that the control piston 8 is in its lowermost end position if the displacement body 7 is not lifted by any liquid, and can rise by a predetermined amount if the displacement body 7 is floated by the liquid to a certain degree.

The valve body 6 is closed at its lower side by a cap 11, the bottom 12 of which serves as a support for the compression spring 10 and as a stop for limiting the movement of the control piston 8.

Instead of the displacement body 7 shown in the drawings any other valve device may be used having a specifically heavier lifting body.

The control piston 8 is provided with a longitudinal bore 13 which is intersected by an upper transverse bore 14 and a lower transverse bore 15. In this way, the operating pressure of the tank 1 prevailing inside the pressure hood 5 of the antechamber is passed to the underside of the control piston 8 and relieves the latter in any position from the operating pressure. A leading or guiding edge 16 of the control piston 8 transfers in the raised position thereof the operating pressure from the antechamber 3 through the channels 14, 13, and 15 to the channel 17 provided in the valve body 6.

In the valve body 6 a piston pump is vertically arranged and comprises essentially a cylinder 18, a pump piston 19, a piston rod 20 rigidly connected to the pump piston 19, and a cover 22 closing at the upper side the annular chamber or space 21 between the wall of the cylinder 18 and the piston rod 20. A packing 23 renders the entrance of the piston rod 20 through the cover 22 airtight, so that the air being present under a high pressure within the annular chamber or space 21 cannot escape upwardly along the piston rod 20. Toward the lower side, the annular chamber or space 21 is sealed by a certain quantity 24 of oil arranged above the piston 19 which is provided with normal sealing rings, and prevents any escape of air toward the piston 19. A further function of said oil 24 will be explained hereinafter.

In the cover 22 is arranged a check valve opening into the annular chamber or space 21, and comprising, for instance, a ball valve 25 and a compression spring 26. Under certain operating conditions set forth hereinafter, the check valve closes an aperture 27 opening into a funnel-shaped attachment 28 and thus into a chamber or space 29 formed by the upper side of the valve body 26 and a cover 30, which communicates with the atmosphere through an opening 31.

As will be seen from Fig. 4, a second check valve 32 arranged in the cover 22 is connected with the valve 25 and provides through a duct 33 a connection with the antechamber 3.

The pump piston 19 and the piston rod 20 are automatically returned into the lower position thereof, for instance by an arm or bracket 34 connected to a tension spring 35, which passes freely through a bore 36 of the valve body 6 and is connected with its other end at 37 to the cylinder 18 so that the spring 35 is tensioned when the piston 19 rises and released when the piston goes down. In order to balance the forces, the tension spring 35 may, of course, be replaced by a plurality of springs arranged symmetrically to the longitudinal axis of the piston.

The arm or bracket 34 carries a downwardly extending control rod 38. This control rod 38 is, as will be seen from Fig. 3, loosely guided through bores 39, 40 in two soft iron plates 41, 42 and a boring 43 in the valve body 6. Furthermore, the rod 38 carries a lower carrier disc 44 and an upper lug 45. A small compression spring 46 is arranged above the lower engaging piece 44 and surrounds loosely the control rod 38 whereas another compression spring 47 of a similar kind and arrangement is provided on the upper soft iron plate 41 between the latter and the upper engaging piece 45.

The two soft iron plates 41, 42 are arranged, respectively, on the transverse faces of a control piston or slide 48 vertically guided within the valve body 6 and having control edges 48a and 48b. The plates 41, 42 extend sideways beyond the magnetic gripping rods 49, 50 arranged in the valve body 6. The adhering surfaces 51, 52 of the gripping rods 49, 50 are flush with the upper and lower sides of the valve body 6 whereas the control piston 48 is longer by a predetermined amount than the thickness of the valve body 6 so that the control piston 48 may be axially displaced by an amount equal to this difference. In its lowermost or uppermost positions the control piston 48 is maintained by the adhering force of the magnetic locking device, including the gripping rods 49, 50 and the soft iron plates 41, 42 until a sufficient force overcomes the adhering force of one or the other of the gripping rods 49, 50 and thus releases the control piston 48 for motion to the other end position thereof as will be more fully described hereinafter.

The reversing of the control piston 48 may be, of course, carried out in any manner. For instance, instead of the magnetic reversing device described hereinabove, a hydraulic reversing device may be provided. In such a reversing device the control piston 48 is moved in the one or the other end position thereof by means of a so-called hydraulic anticipatory piston which in turn is moved into the anticipating positions by the control rod 38.

Between the control edges 48a and 48b of the control piston 48 is arranged a small annular compartment of space 53. In the lower position of the control piston 48 shown in the drawing, the channel 17 is connected over the annular compartment or space 53 and a connection 54 with the chamber or space 55 enclosed by the cylinder 18 below the piston 19 whereas the connection 56 leading upwards through the valve body 6 is closed by the upper control edge 48b of the control piston 48. In the upper position (not shown) of the control piston 48, however, the control edge 48a closes the channel 17, and the connection 54 is connected over the annular compartment or space 53 with the connection 56.

The mouth of the connection 54 leading into the compartment or space 53 of the cylinder 18 should be arranged at a place of the cylinder being as low as possible. The connection 56 opens with a horizontal nozzle-like outlet 57 above the funnel-shaped attachment 28 approximately parallel to the longitudinal axis of the vertical figure (oval or ellipse) formed by the upper edge of the funnel 28 in a horizontal plane.

The cylinder 18, the tension spring 34, the control rod 38, and the connection 54 are preferably arranged in a chamber or space 58 which is formed by a lower cover or hood 59 and the lower surface of the valve body 6. A discharge pipe 60 leads from the lowermost portion of the hood 59 into a small collecting tank 61 equipped with an overflow from which a connecting pipe 62 leads to the oil storage tank (not shown) which is under atmospheric pressure.

The chamber or space 58 is connected by the bores 36 and 43 with the upper chamber or space 29, so that both chambers or spaces have only atmospheric pressure.

The operation of the control device is as follows:

As set forth hereinabove, the oil level 4 oscillates in normal operation between the upper predetermined level (Fig. 1) and a lower pump starting level. When the predetermined level is exceeded, i. e. when the air cushion becomes too small, the control device has the function to restore the air cushion to the desired volume. The control device, therefore, is actuated only when the predetermined oil level is exceeded. The height of the level at which the pipe 2 connecting the pressure tank 1 with the control device opens into the tank 1 determines constructively the air volume in the tank.

As soon as, on operation of the plant, the oil level 4 rises beyond the predetermined height, oil will flow through the horizontal or slightly downwardly inclined connecting pipe 2 into the antechamber 3 of the control device in which the displacement body 7 is kept by its own weight in the lowermost position. The oil enters through the bores 14, 13, and 15 also into the chamber below the piston 8, and the air contained in the antechamber 3 escapes through the pipe 2 into the air space or cushion of the pressure tank 1. In this lowermost position of the control piston 8, the channel 17 remains closed.

When the oil level in the antechamber 3 rises, the displacement body 7 is subjected to an uplift which in combination with the lifting force of the compression spring 10 is sufficient to raise the weight of the displacement body 7 and the control piston 8 before the displacement body 7 is totally immersed in oil. In consequence thereof, the control edge 16 unblocks the path of the oil from the antechamber 3 to the channel 17.

The oil flowing from the antechamber 3 through the channels 14, 13, 15, and 17 enters now the bore 55 of the cylinder 18 through the annular compartment or space 53 and the conduit 54 since the control piston 48 is in the lower end position thereof. The pump piston 19 is lifted and pushes the piston rod 20 against the increasing tension of the spring 35 upwardly out of the cylinder 18, which is closed by the cover 22.

Since the annular chamber 21 formed between the cylinder 18 and the piston rod 20 is closed downwardly by the oil 24 carried on the pump piston 19 and upwardly by the check valve 25, the rising pump piston 19 compresses the air in the chamber 21 at first to the operating pressure obtaining in the tank 1, which operating pressure obtains also within the antechamber 3 and the cylinder bore 55 below the pump piston 19. Due to the surface differential between the lower side of the pump piston 19 and its upper side whose area is decreased by the cross sectional area of the piston rod 20, and due to the fact that the piston rod 20 extending outside the cylinder 18 is only under atmospheric pressure and that the pull of the return spring 35 is relatively small, the pump piston 19 keeps rising even after the operating pressure is reached in the annular chamber 21. As a result, the pressure in said annular chamber 21 becomes greater than that in the cylinder bore 55, below the piston 19, and the check valve 32 is opened and admits the compressed air from the annular chamber 21 through the conduit 33 into the antechamber 3 and hence through the pipe 2 into the air cushion of the pressure tank 1.

The amount of oil carried on the upper side of the pump piston head 19 and filling the bottom of the annular chamber 21 not only provides an absolutely reliable seal against an escape of air toward the lower side, but serves an additional extremely important function. The quantity 24 of oil is chosen so as to displace completely the air from the annular chamber or space 21 and the space of the check valve 25 before the pump piston 19 reaches its upper end position; in this way, the dead space above the pump piston 19 is completely eliminated by forcing first air and subsequently oil through the check valve 32 and the connection into the antechamber 3. This means that with such a compressing system any desired high pressures can be obtained since the initial volume in the annular chamber or space 21 is reduced to zero toward the end of the compression.

The movement of the pump piston 19 controls also the mechanical reversing mechanism. The control rod 38 which is rigidly connected to the piston rod 20 and carries loosely at its lower end on the disc 44 the compression spring 46, impinges, on its approach to the upper reversing position, against the lower soft iron plate 42 of the control piston 48, which at this time still adheres with its upper soft iron plate 41 to the upper magnetic gripping rod 49. Only when, on further upward movement of the piston 19 and the control rod 38, the compression spring 46 is sufficiently compressed, can it overcome the adhering force of the upper gripping rod 49; the magnetic locking device 41, 51, 49, is then disengaged and the control piston 48 leaps into its upper end position in which it is maintained by the lower magnetic locking device 42, 52, 50.

By the shift of the control piston 48 into its upper end position the admission of oil from the channel 17 through the conduit 54 into the cylinder bore 55 below the piston 19 is blocked, while the displacement body 7 and the control piston 8 are still in raised positions, but instead a connection between the conduits 54 and 56 is established over the annular compartment or space 53 provided around the control piston 48 so that the cylinder bore 55 below the piston 19 comes now under atmospheric pressure. The tension spring 35 or an equivalent elastic member which has been tensioned during the upward motion of the piston rod 20 brings the latter and the pump piston 19 back into their lowermost position and allows thereby the oil to escape from the cylinder bore 55 below the piston 19 and the conduits 54 and 56.

By the concurrent increase in volume of the annular chamber or space 21, the check valve 32, through which at first air and at the end of the pump stroke also part of the oil 24 was conveyed into the antechamber 3, is closed instantaneously under the action of the operating pressure, whereas the check valve 25 opens because of the reduced pressure in the annular chamber or space 21. In consequence thereof, air can flow from the upper chamber or space 29 into the annular chamber or space 21, while atmospheric air flows through the opening 31 in the cover 30 into the upper chamber or space 29.

The force of the return spring 35 has its maximum at the start of the return movement of the pump piston 19 and becomes gradually smaller with the downstroke of the pump piston. For these reasons, the oil escapes, at first quickly, from the compressing chamber 55, i. e., it is sprayed from the nozzle-like outlet 57 of the conduit 56 at first in a wide jet, shown as a heavy dotted line in Fig. 2, over the funnel-shaped attachment 28 against the wall of the upper chamber 29 of the pump housing and is conveyed from here through the openings 36 and 43 of the valve body 6 into the lower chamber 58, collects at the lower end of said chamber 58 and flows through a discharge pipe 60 into the collecting tank 61 from which it is discharged through the overflow and the connecting pipe 62 to an oil storage tank (not shown), which is under atmospheric pressure.

When towards the end of the return stroke of the pump piston 19 the force of the spring 35 decreases, and thus the discharge velocity of the cycled oil diminishes, the latter will flow along the path indicated by the lightly dotted line shown in Fig. 2 into the funnel-shaped attachment 28 and from here over the check valve 26 and the bore 27 into the compression chamber 21, so that no longer air but said oil is drawn into the compression chamber 21. In this manner, the quantity of oil 24 at the bottom of the compression chamber 21 is replenished at least by that amount of oil which has been pressed into the antechamber or float chamber 3 toward the end of the compression stroke.

Figure 3:
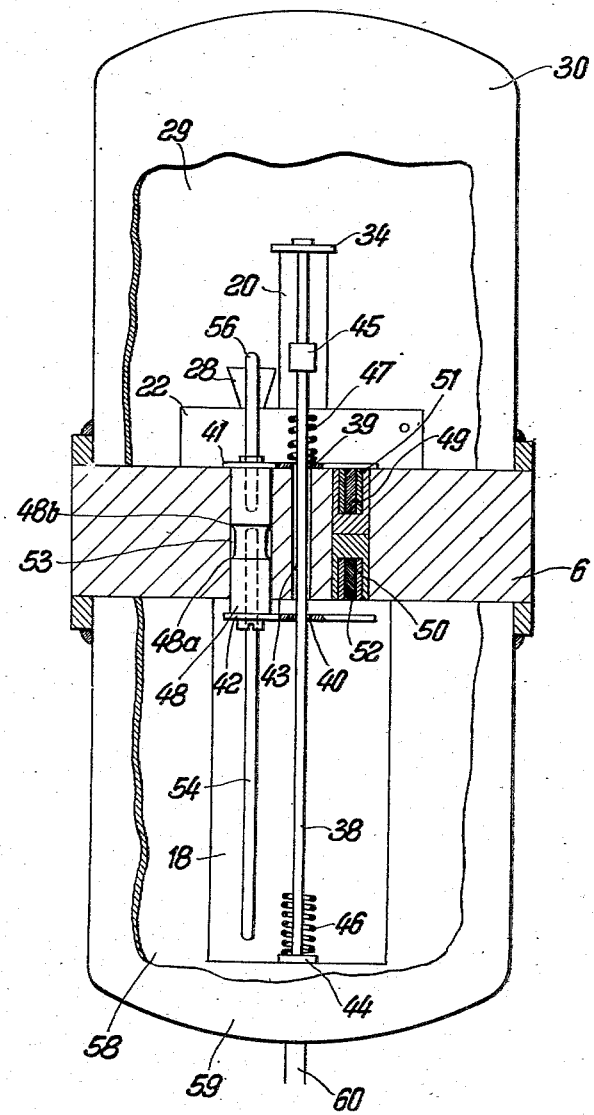
Fig. 3 is a side view, partly in section, of the controlling device shown in Fig. 2, the sectional plane being at right angles to the plane I—I of Fig. 2.

When the pump piston 19 approaches its lower end position, the lug 45 of the control rod 38 rigidly connected with the pump piston 19 comes to rest on the upper compression spring 47 and compresses the same until its tension is sufficient to overcome the adhering force of the lower gripping rod 50 which still holds with its adhering surface 52 the lower soft iron plate 42 of the control piston 48; as a result, the latter falls back into its lower end position shown in Figs. 2 and 3 and reestablishes thereby the connection of the channel 17 with the cylinder bore 55 below the pump piston 19 so that on raising of said pump piston 19 the check valve 25 is closed and another cycle of the controller may be started.

Thus, with each operating cycle of the controller a certain amount of air is fed to the air cushion of the pressure tank 1. The cycles of the controller last as long as the oil level 4 surpasses the predetermined level. If the oil level sinks below the predetermined level, the controller keeps operating until so much of the oil in the antechamber 3 has been used up that the uplift of the displacement body 7 even if aided by the compression spring 10 is not sufficient for keeping the piston 8 in its upper position so that the controlling edge 16 shuts off the channel 17 and the controller is put out of operation.

The device according to the invention is also suited to catch any water that may be separated from the air and gets into the pressure oil, so that under no circumstances the water can pass into the pressure tank 1. This water precipitates from the atmospheric air when the latter is compressed without being heated simultaneously. Under unfavorable conditions a certain portion of the water may enter the antechamber 3 through the conduit 33 conveying the compressed air, and toward the end of the pressure stroke also oil, into the antechamber 3. Since, however, during the operation of the controller, oil is present in the antechamber 3, the air is able to rise at once therein and to be transported through the pipe 2 into the pressure tank 1 whereas any water entrained by the air separates, owing to its larger weight, at the bottom of the antechamber 3 below the oil charge. Hence, the water travels, when the control device is in operation, from the bottom of the float chamber 3 with the oil into the compressing chamber 55 and from there during the return stroke of the piston through the conduits 54, 56, and 60 into the tank 61, in which the water separates at the bottom so that the oil leaving the controller is withdrawn in an essentially water-free condition through the overflow and the connecting pipe 62 into the oil storage tank. If the collecting tank 61 is emptied from time to time, the separated water can be readily removed therefrom and the operating oil is continuously maintained free of water.

It will be understood that the invention is not limited to the specific details shown, but that modifications may be made within the scope of the accompanying claims without departing from the principles of the invention.

We claim:

1. An automatic air volume control for high pressure liquid supply systems comprising a pressure tank containing a liquid and an air cushion above said liquid, a float chamber arranged below a predetermined liquid level of said tank, a conduit connecting the pressure tank from said predetermined liquid level with said float chamber, a piston air-pump hydraulically operated by the liquid of the pressure tank for replenishing said air cushion when said predetermined liquid level is exceeded, said pump comprising a closed cylinder, a piston slidable in said cylinder and defining a compressing chamber and a compression chamber, a cylinder head, and a piston rod extending through said cylinder head; a liquid conduit connecting said float chamber with said compressing chamber; an air connection between said compression chamber and said tank; operating liquid carried on said piston in an amount sufficient to expel the air completely from said compression chamber during the compression stroke of said piston; a float in said float chamber, and float-controlled valve means in said liquid conduit, said valve means being opened when said float is raised by liquid entering the float chamber from the pressure tank and closed when the air cushion in the tank has been replenished.

2. A device as claimed in claim 1 wherein said air connection comprises an air conduit connecting said compression chamber through said cylinder head with said float chamber and a conduit connecting said float chamber with said tank.

3. A device as claimed in claim 1 wherein said float is a displacement body having a higher specific gravity than said liquid.

4. A device as claimed in claim 3 including a spring assisting the uplift of said displacement body by the displaced liquid.

5. The device defined in claim 4 wherein said spring is a compression spring.

6. A device as claimed in claim 1, wherein said piston pump is a differential pressure pump and wherein a housing is provided enclosing said pump.

7. A device as claimed in claim 6 including a conduit for discharging the operating liquid expelled from said compressing chamber on the return stroke of the piston into said piston pump housing and a means to feed part of said discharged liquid into said compression chamber so as to replenish the operating liquid carried on said piston.

8. A device as claimed in claim 7 including a slide valve slidable between two end positions, the first of said end positions opening said liquid conduit and closing said discharge conduit, the second of said end positions closing said liquid conduit and opening said discharge conduit; means holding said slide valve in the respective end positions, and elastic means tensioned by the piston rod during the compression stroke of the piston and disengaging the holding means for said first end position towards the end of the compression stroke, so as to allow said slide valve to be shifted into said second end position.

9. A device as claimed in claim 8 wherein said slide valve is a piston valve.

10. A device as claimed in claim 8 wherein said holding means are magnetic locking means.

11. A device as claimed in claim 8 wherein said elastic means is a coil spring assisting the return stroke of the piston to discharge the liquid from the compressing chamber.

12. A device as claimed in claim 1 for oil supply systems wherein the conduit connecting the pressure tank and the float chamber opens into the top of said float chamber and wherein said air conduit opens into the lower part of said float chamber, said air conduit passing compressed air into said lower part of the float chamber while it is filled with oil, whereby any condensed water in said compressed air is held back by said oil and the air passes substantially free of condensed water into the pressure tank.

13. A device as claimed in claim 1 wherein the pump housing comprises an upper and a lower chamber communicating with each other, an opening to the atmosphere in said upper chamber and an oil discharge pipe at the bottom of said lower chamber.

References Cited in the file of this patent

UNITED STATES PATENTS 2,231,307     Wallace     Feb. 11, 1941
2,450,781     Carlson     Oct. 5, 1948